(12) United States Patent
Huttsell et al.

(10) Patent No.: US 7,857,375 B2
(45) Date of Patent: Dec. 28, 2010

(54) DUAL SUPPORT PAD FOR A VEHICLE DOOR

(75) Inventors: Benjamin Huttsell, Dublin, OH (US); David Pietenpol, Upper Arlington, OH (US); Satoshi Endo, Nasukarasuyama (JP)

(73) Assignee: Honda Motor Co., Ltd., Tokyo (JP)

( * ) Notice: Subject to any disclaimer, the term of this patent is extended or adjusted under 35 U.S.C. 154(b) by 154 days.

(21) Appl. No.: 12/043,837

(22) Filed: Mar. 6, 2008

(65) Prior Publication Data

US 2009/0224571 A1    Sep. 10, 2009

(51) Int. Cl.
*B60J 5/04* (2006.01)
(52) U.S. Cl. .............................. 296/146.6; 296/187.05; 296/187.12
(58) Field of Classification Search ............ 296/187.12, 296/146.1, 146.5–146.7, 153, 187.05, 39.1
See application file for complete search history.

(56) References Cited

U.S. PATENT DOCUMENTS

| | | | | |
|---|---|---|---|---|
| 4,783,114 A | * | 11/1988 | Welch ......................... | 296/153 |
| 5,102,163 A | * | 4/1992 | Ishikawa ..................... | 280/751 |
| 5,306,066 A | * | 4/1994 | Saathoff ................... | 296/146.6 |
| 5,395,135 A | * | 3/1995 | Lim et al. ................... | 280/751 |
| 5,482,344 A | * | 1/1996 | Walker et al. .............. | 296/39.1 |
| 5,542,738 A | | 8/1996 | Walker et al. | |
| 5,580,119 A | * | 12/1996 | Uchida et al. ............ | 296/146.6 |
| 5,749,600 A | | 5/1998 | Yamada et al. | |
| 5,865,496 A | * | 2/1999 | Odan et al. ............... | 296/146.6 |
| 6,039,387 A | * | 3/2000 | Choi ....................... | 296/187.12 |
| 6,164,716 A | | 12/2000 | Palazzolo et al. | |
| 6,203,096 B1 | | 3/2001 | Noda et al. | |
| 6,378,896 B1 | * | 4/2002 | Sakakida et al. ......... | 280/730.2 |
| 6,447,047 B1 | * | 9/2002 | Marcovecchio et al. .. | 296/146.7 |
| 6,543,838 B1 | * | 4/2003 | Bertolini et al. .......... | 296/146.1 |
| 6,672,648 B2 | | 1/2004 | Heranney | |
| 6,688,671 B2 | * | 2/2004 | Fukutomi ................ | 296/146.6 |
| 6,942,281 B2 | | 9/2005 | Omori et al. | |
| 7,014,249 B2 | * | 3/2006 | Karuppaswamy et al. ....................... | 296/146.6 |
| 7,121,611 B2 | * | 10/2006 | Hirotani et al. .......... | 296/146.7 |
| 7,156,448 B2 | | 1/2007 | Armbruster et al. | |
| 7,357,444 B2 | * | 4/2008 | Cowelchuk et al. .... | 296/187.05 |
| 2002/0093219 A1 | * | 7/2002 | Traister et al. ........... | 296/146.6 |
| 2007/0013206 A1 | * | 1/2007 | Huttsell et al. ........... | 296/146.6 |

OTHER PUBLICATIONS

International Search Report and Written Opinion, mailed Jun. 19, 2009, from PCT Application No. PCT/US2009/036143.

* cited by examiner

*Primary Examiner*—Glenn Dayoan
*Assistant Examiner*—Gregory Blankenship
(74) *Attorney, Agent, or Firm*—Plumsea Law Group, LLC

(57) ABSTRACT

A collision absorption system including a dual support pad for a vehicle door is disclosed. The system includes an integrated dual support pad comprising a first portion and a second portion configured to reduce the force of impact to a shoulder portion and a hip portion, respectively, of a vehicle occupant during a side impact collision.

27 Claims, 8 Drawing Sheets

DUAL SUPPORT PAD FOR A VEHICLE DOOR

BACKGROUND OF THE INVENTION

1. Field of the Invention

The present invention relates generally to motor vehicles and in particular to a dual support pad for a vehicle door.

2. Description of Related Art

Devices and systems that attempt to reduce occupant injury in the event of a collision have been previously proposed. In some cases, a soft padding material can be used to absorb energy and reduce or eliminate injury during a collision. Yamada et al. (U.S. Pat. No. 5,749,600) teaches a door trim energy absorbing member for a motor vehicle. Yamada teaches an energy absorbing member that is provided on a door trim to correspond to a position in a vicinity of a femur of a vehicle occupant. During an impact, the energy absorbing member may be disposed proximate to the femur of the occupant to provide protection to the vicinity of the femur.

Lim et al. (U.S. Pat. No. 5,395,135) teaches an energy absorbing vehicle door. Lim teaches a set of energy bolsters that protract through a door trim panel to provide protection to an occupant during a side collision type impact of the vehicle door. Lim teaches absorption bolsters that may be made of foam blocks. Furthermore, Lim teaches that the bolsters are configured to protect the chest, pelvis and leg portions of the occupant.

Lim and Yamada both lack provisions for using a single pad to provide protection for multiple portions of an occupant, including the shoulder region and the hip region. Instead, Yamada teaches a single pad that provides protection for the region around the femur only. Also, while Lim teaches pads for protecting multiple regions, this is accomplished through the use of multiple pads, rather than a single pad.

Palazzolo et al. (U.S. Pat. No. 6,164,716) teaches a pad for a door that is sized to cushion both the shoulder and hip of a vehicle occupant. Palazzolo teaches a single pad that fills the entire interior space of the vehicle door. However, Palazzolo lacks provisions for increasing the support for the pad.

There is a need in the art for a solution that addresses the problems of the prior art.

SUMMARY OF THE INVENTION

A collision absorption system including a dual support pad for a vehicle door is disclosed. The invention can be used in connection with a motor vehicle. The term "motor vehicle" as used throughout the specification and claims refers to any moving vehicle that is capable of carrying one or more human occupants and is powered by any form of energy. The term motor vehicle includes, but is not limited to cars, trucks, vans, minivans, SUV's, motorcycles, scooters, boats, personal watercraft, and aircraft.

In one aspect, the invention provides a door of a motor vehicle, comprising: an outer shell facing an exterior of the vehicle; an interior trim panel having an inner surface facing an interior of the vehicle; an upper impact beam disposed adjacent to the outer shell and a lower impact beam disposed adjacent the outer shell and disposed below the upper impact beam; a dual support pad having a first portion configured to align with a shoulder portion of an occupant and a second portion configured to align with a hip portion of the occupant; and where the first portion is associated with the upper impact beam and the second portion is associated with the lower impact beam.

In another aspect, the dual support pad is attached to the upper impact beam using a brace.

In another aspect, the dual support pad is attached to the upper impact beam using one or more clips.

In another aspect, the dual support pad is attached to the lower impact beam using a brace via a clip.

In another aspect, the second portion includes an extended portion.

In another aspect, the first portion and the second portion are integrally formed.

In another aspect, the invention provides a door of a motor vehicle, comprising: a dual support pad configured to provide support to a shoulder of an occupant and to a hip portion of the occupant; an impact beam associated with an interior of the vehicle door; an interior trim panel disposed proximate to an interior of the motor vehicle; and where a portion of the dual support pad is disposed between the impact beam and the interior trim panel.

In another aspect, the dual support pad includes a first portion configured to align with a shoulder portion of a vehicle occupant and a second portion configured to align with a hip portion of a vehicle occupant.

In another aspect, the door includes an upper impact beam and a lower impact beam.

In another aspect, the first portion is associated with the upper impact beam and the second portion is associated with the lower impact beam.

In another aspect, the first portion is attached to the upper impact beam using a brace.

In another aspect, the first portion is attached to the upper impact beam using one or more clips.

In another aspect, the door includes an upper pad that is configured to align with the first portion of the dual support pad.

In another aspect, the invention provides a door of a motor vehicle, comprising: an outer shell facing an exterior of the motor vehicle; an interior trim panel having an inner surface facing an interior of the vehicle; a dual support pad configured to provide support to a shoulder of a vehicle occupant and to a hip portion of the vehicle occupant; the dual support pad being disposed adjacent to the outer shell; an upper pad disposed between the interior trim panel and the dual support pad; and where a first portion of the dual support pad is configured to contact the upper pad during a side impact collision.

In another aspect, the upper pad is associated with the shoulder portion of a vehicle occupant.

In another aspect, the first portion is associated with the shoulder portion of the vehicle occupant.

In another aspect, the dual support pad includes a second portion that is integrally formed with the first portion and where the second portion is associated with the hip portion of the vehicle occupant.

In another aspect, the dual support pad is associated with an upper impact beam and a lower impact beam.

In another aspect, the first portion is associated with the upper impact beam and the second portion is associated with the lower impact beam.

In another aspect, the dual support pad is attached to the lower impact beam and the upper impact beam using clips.

In another aspect, the upper pad may be separated from the first portion by a window associated with the door when the window is in a lowered position.

In another aspect, the invention provides a collision absorption system for a motor vehicle, the system comprising: a dual support pad having a first portion configured to align with a shoulder portion of an occupant and a second portion configured to align with a hip portion of the occupant, the second portion comprising an extended portion configured to extend further towards the hip portion of the occupant; and where the first portion is integral with the second portion, and the first portion comprises a first attachment portion for attachment to an upper impact beam with a first clip, and the second portion comprises a third attachment portion for attachment to a lower impact beam with a third clip.

In another aspect, the dual support pad is associated with a front door of the motor vehicle.

In another aspect, the dual support pad is associated with a door panel of the motor vehicle.

In another aspect, the dual support pad is associated with a tailgate of the motor vehicle.

In another aspect, the first portion of the dual support pad includes a recess configured to receive an upper impact beam.

In another aspect, the recess is disposed adjacent to an outer shell of the motor vehicle.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION OF THE PREFERRED EMBODIMENTS

Figure 1:
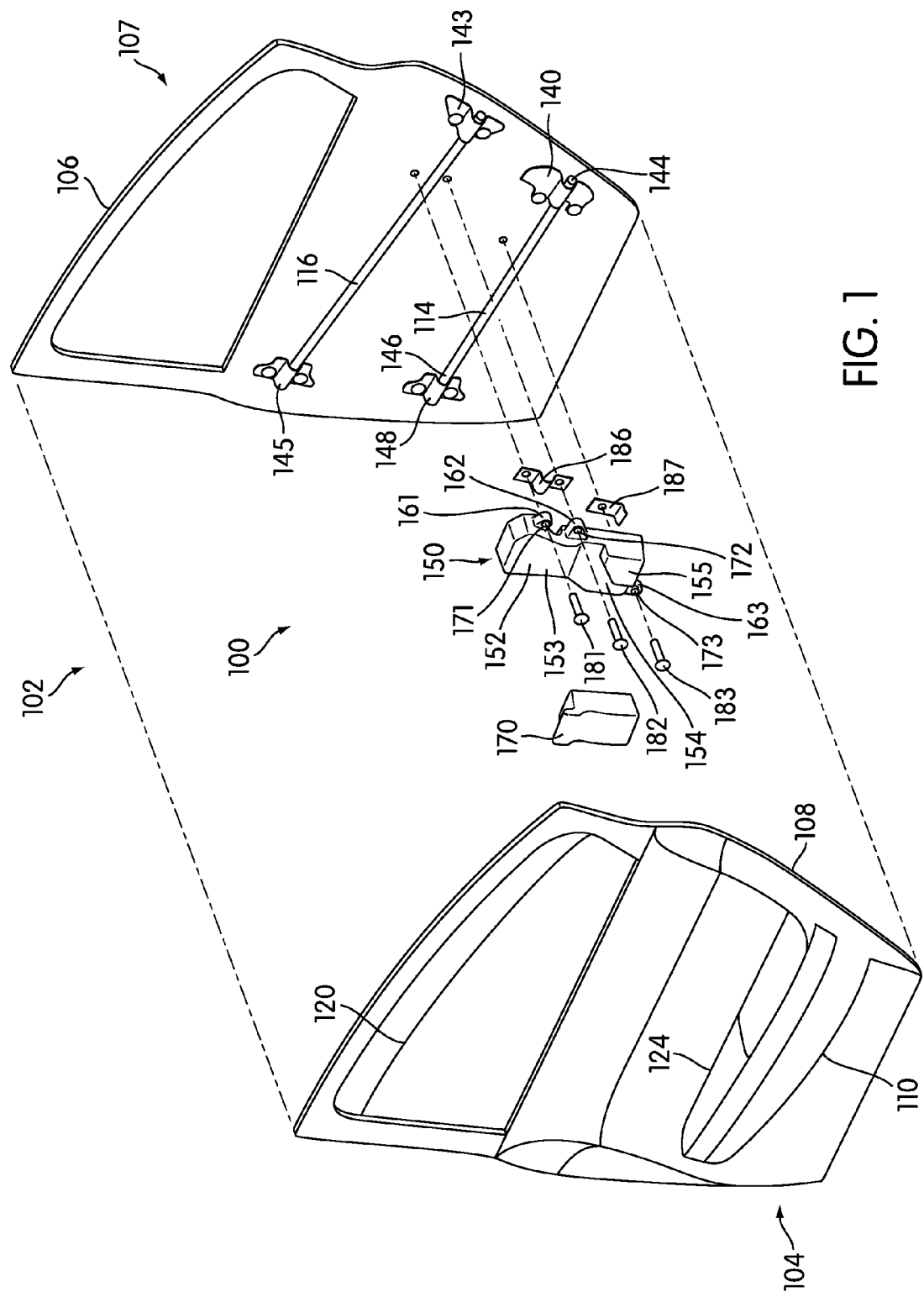
FIG. 1 is an exploded isometric view of a preferred embodiment of a collision absorption system.

FIG. 1 illustrates an exploded isometric view of a collision absorption system, according to one embodiment of the invention. Preferably, one or more doors of a motor vehicle include provisions to prevent or reduce occupant injury in a collision. While the following disclosure teaches an exemplary system and method for use with a front side passenger, all of the principles, teachings and concepts are also applicable to any other occupant in a motor vehicle.

In some embodiments, a door may include an outer shell that is associated with an exterior of a motor vehicle. During a collision, the outer shell may be the first portion of the motor vehicle door that is contacted. Additionally, in some embodiments, a door may include an inner shell that is associated with an interior of a motor vehicle. In some cases, the inner shell may be further associated with an interior trim panel. In a preferred embodiment, a door may include additional provisions for absorbing the force of a collision and helping to protect a vehicle occupant.

Figure 2:
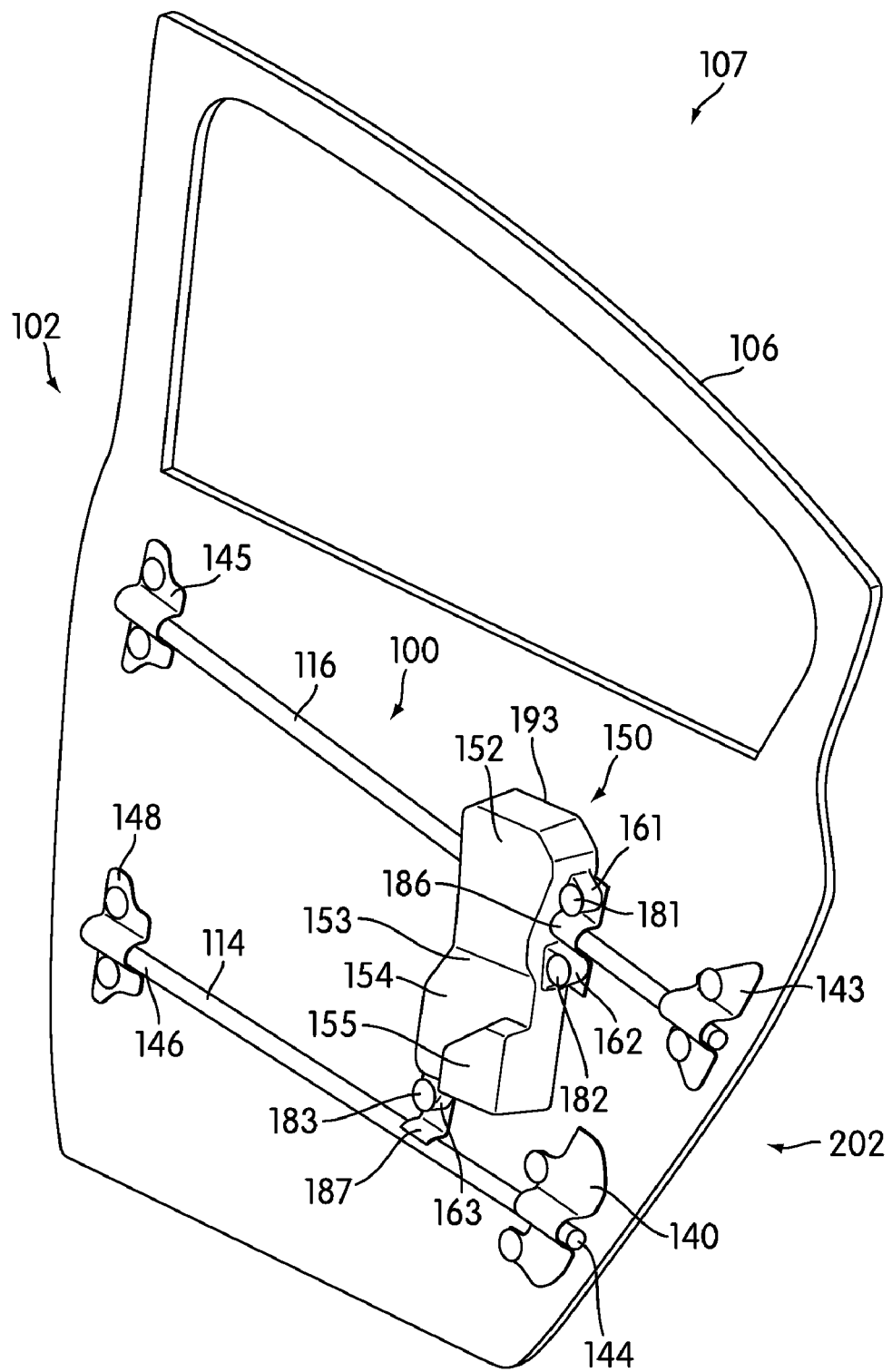
FIG. 2 is an assembled view of a preferred embodiment of a portion of a collision absorption system.

Referring to FIGS. 1 and 2, collision absorption system 100 may be associated with door 102. Generally, collision absorption system 100 may include various components including impact beams, pads and other components. Additionally, door 102 may be associated with additional features not directly related to collision absorption system 100. For purposes of illustration, only some components associated with door 102 are illustrated in the current embodiment. It should be understood, however, that door 102 can also include additional features not illustrated here.

Preferably, door 102 includes outer shell 106 that faces exterior 107 of a motor vehicle. Additionally, door 102 may include inner shell 108 disposed towards interior 104 of a motor vehicle. In some embodiments, outer shell 106 and inner shell 108 comprise the steel structure of door 102. In other embodiments, outer shell 106 and inner shell 108 could be associated with another reinforcing structure.

Some embodiments include interior trim panel 110 that is associated with inner shell 108. In some cases, interior trim panel 110 faces interior 104 of the motor vehicle and provides a finish to door 102. Additionally, in some embodiments, interior trim panel 110 includes arm rest 124 that is integrally molded with interior trim panel 110. In other embodiments, interior trim panel 110 may include additional provisions, including storage compartments, vents, electrical window or door lock controls and speakers as well as other provisions.

In some embodiments, window 120 is disposed between outer shell 106 and inner shell 108. When reference is made to window 120 in this description, it is sometimes assumed that window 120 is in the up or raised position. Of course, window 120 can also be lowered to assume an open position.

In some embodiments, to prevent intrusion by foreign objects during a side impact collision, some embodiments of a door can include one or more impact beams. In some cases, a single impact beam could be associated with a door. In other cases, more than one impact beam could be associated with a door. In a preferred embodiment, the door may include an upper impact beam and a lower impact beam.

In this embodiment, door 102 can include lower impact beam 114 and upper impact beam 116. Preferably, lower impact beam 114 is configured to attach to outer shell 106. Likewise, upper impact beam 116 is preferably configured to attach to outer shell 106. In one embodiment, lower impact beam 114 may be disposed across outer shell 106 in a generally longitudinal direction. The term "longitudinal direction" as used throughout this detailed description and in the claims refers to a direction running from a front of a motor vehicle to a back of a motor vehicle. Also, upper impact beam 116 may be disposed across outer shell 106 in a generally longitudinal direction. In some cases, impact beams 114 and 116 could be slightly angled with respect to the longitudinal direction. Using this arrangement, impact beams 114 and 116 may help reduce the force transferred from outer shell 106 to inner shell 108 during a collision, thus helping reduce potential impact to a vehicle occupant.

It should be understood that in other embodiments, impact beams could be oriented in directions other than a longitudinal direction. Generally, an impact beam may be configured to extend across the length of an associated outer shell. In some cases, the outer shell may be oriented laterally with respect to a motor vehicle, and therefore the associated impact beams may be disposed generally laterally with respect to the motor vehicle.

Preferably, collision absorption system 100 includes provisions for attaching impact beams 114 and 116 to outer shell 106 of door 102. In this embodiment, lower impact beam 114 may be attached to outer shell 106 using first brace 140. Preferably, first brace 140 may be welded directly to outer shell 106. In other embodiments, first brace 140 may be attached directly to outer shell 106 using screws or another provision. First brace 140 may be configured to receive first end 144 of lower impact beam 114. Using this arrangement, first end 144 may be secured in place with respect to outer shell 106 using first brace 140.

Additionally, lower impact beam 114 may be attached to outer shell 106 using second brace 148. Preferably, second end 146 of lower impact beam 114 may be attached to outer shell 106 using second brace 148 in a manner similar to the way that first end 144 is attached to outer shell 106 using first brace 140. Furthermore, in this embodiment, upper impact beam 116 may be attached to outer shell 106 using third brace 143 and fourth brace 145. Preferably, upper impact beam 116 is fixed in place with respect to outer shell 106 using third brace 143 and fourth brace 145 in a manner similar to the way that lower impact beam 114 is fixed to outer shell 106 using first brace 140 and second brace 148.

In some embodiments, a door may include padding of some kind to help provide protection to a vehicle occupant. In some cases, the padding may be associated with a lower portion of a vehicle occupant, such as a hip portion. In other cases, the padding may be associated with an upper portion of a vehicle occupant, such as a shoulder portion. In a preferred embodiment, the padding may be associated with both the lower portion and the upper portion of the vehicle occupant, including the hip portion and the shoulder portion.

In some embodiments, collision absorption system 100 includes dual support pad 150. Dual support pad 150 preferably comprises first portion 152 and second portion 154. Preferably, first portion 152 is integrally formed with second portion 154. In a preferred embodiment, first portion 152 may be configured to align with a shoulder portion of a vehicle occupant. Additionally, second portion 154 may be configured to align with a hip portion of a vehicle occupant.

In some embodiments, first portion 152 may be configured to provide protection and impact absorption to a shoulder portion of an occupant during a collision. Likewise, in some embodiments, second portion 154 may be configured to provide protection and impact absorption to a hip portion of an occupant during a collision. In other embodiments, dual support pad 150 may be configured to associate with additional portions of a vehicle occupant as well, including the chest, side and leg portions of an occupant.

In some embodiments, second portion 154 may include one or more portions that extend further towards an interior of the motor vehicle, in order to provided additional protection for a hip portion of a vehicle occupant. In this embodiment, second portion 154 includes extended portion 155. Preferably, extended portion 155 bulges towards an interior of the motor vehicle. In some cases, extended portion 155 may be configured to confront inner shell 108 directly. In other cases, extended portion 155 may be configured to confront another pad associated with door 102. With this arrangement, extended portion 155 of second portion 154 may extend further towards the hip portion of the vehicle occupant, as the hip portion is generally recessed with respect to the shoulder portion.

Figure 3:
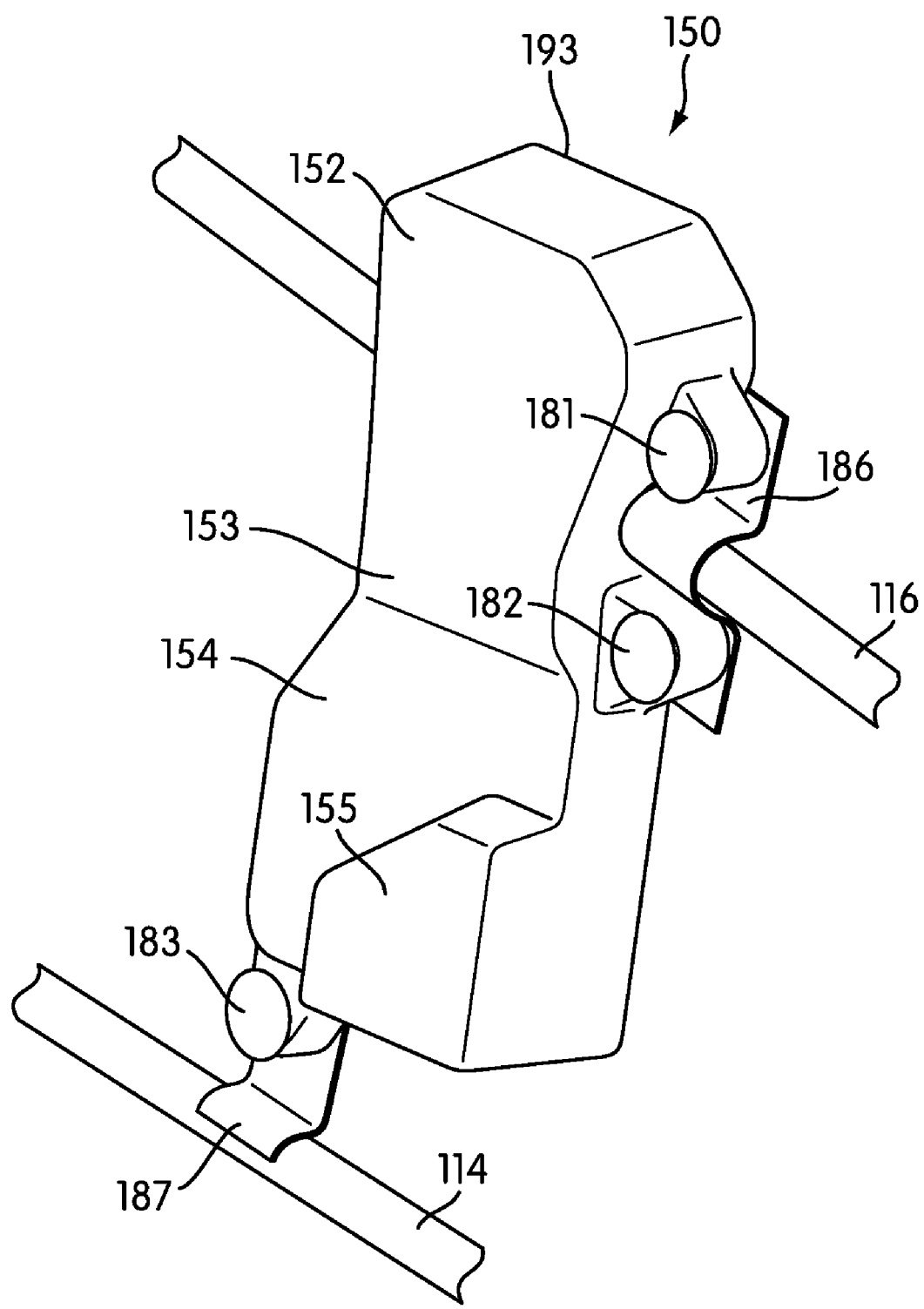
FIG. 3 is an enlarged isometric view of a preferred embodiment of a dual support pad.

Referring to FIGS. 2-3, dual support pad 150 includes outer portion 193 that is shaped to confront outer shell 106. In particular, outer portion 193 may be contoured to the surface of outer shell 106. In the current embodiment, outer shell 106 is generally flat, with some slight curvature and therefore outer portion 193 is also generally flat with some slight curvature. However, in other embodiments, outer shell 106 could have any shape and outer portion 193 could be configured to conform to the shape of outer shell 106. Using this arrangement, a majority of dual support pad 150 may be in contact with outer shell 106 during a collision, which may facilitate increased absorption of the force over the entirety of dual support pad 150.

Furthermore, dual support pad 150 may be configured to associate with other components of collision absorption system 100. Generally, dual support pad 150 may include any number of recesses associated with any components of collision absorption system 100. In some embodiments, dual support pad 150 may include recesses for receiving impact beams. In some cases, first portion 152 and second portion 154 may include recesses for receiving upper impact beam 116 and lower impact beam 114, respectively.

Figure 4:
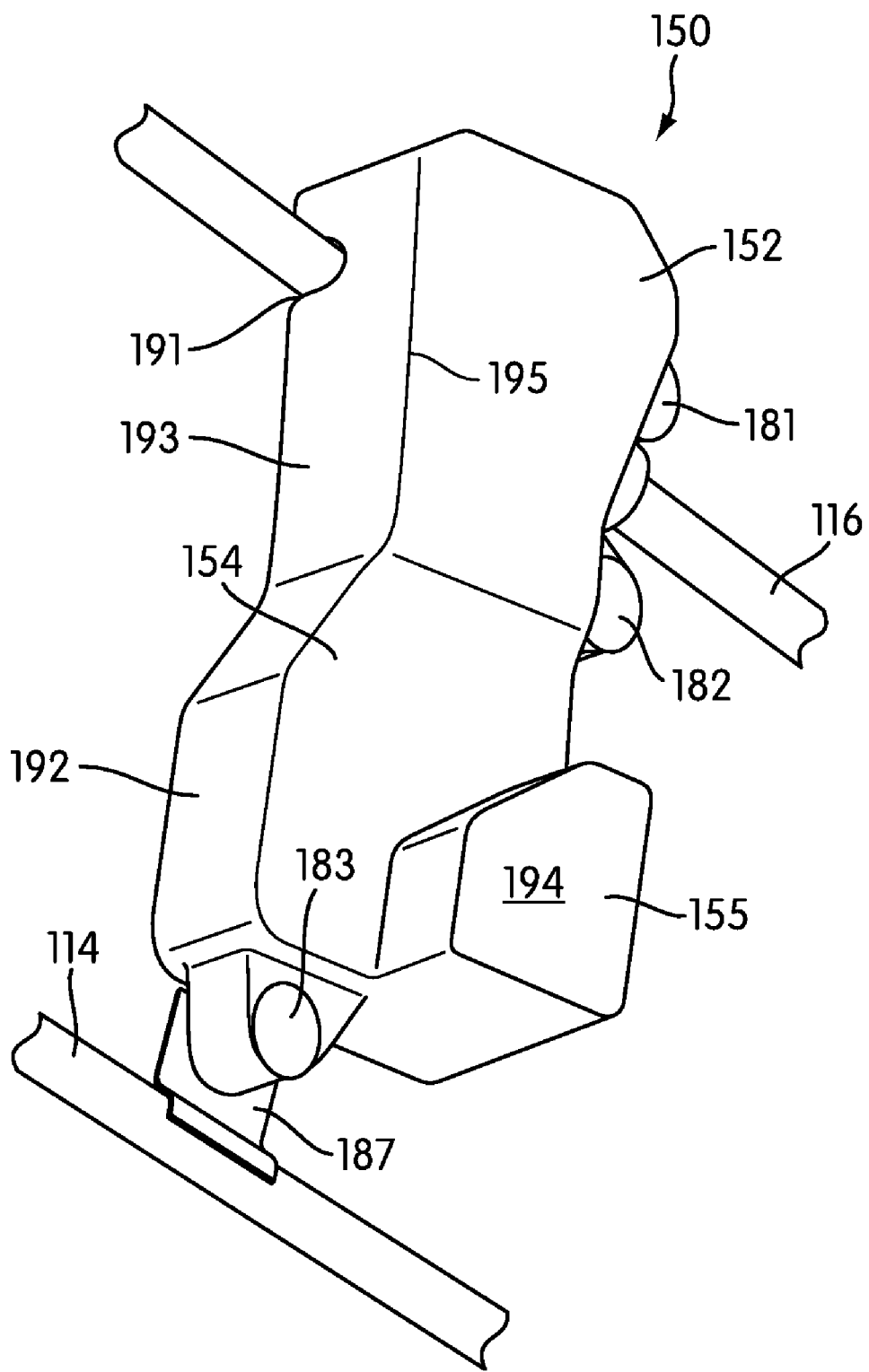
FIG. 4 is an enlarged isometric view of a preferred embodiment of a dual support pad.

Referring to FIG. 4, in this preferred embodiment, first portion 152 of dual support pad 150 includes recess 191 for upper impact beam 116. Recess 191 may be a c-shaped channel in first portion 152 that is preferably configured to receive upper impact beam 116. In some embodiments, recess 191 may be associated with outer portion 193 of dual support pad 150. With this arrangement, upper impact beam 116 may be received at outer portion 193 and away from inner portion 195 of dual support pad 150. This configuration provides for some cushioning between upper impact beam 116 and a vehicle occupant during a collision, as inner portion 195 of dual support pad 150 is closest to a vehicle occupant during a collision. Furthermore, by including recess 191 for upper impact beam 116, dual support pad 150 may absorb and distribute force as upper impact beam 116 is struck during a collision.

Additionally, in this embodiment, lower impact beam 114 is disposed below dual support pad 150 and is generally aligned with thin portion 192 of second portion 154. In other words, both lower impact beam 114 and thin portion 192 are disposed adjacent to outer shell 106. Furthermore, extended portion 155 extends inwardly, in front of thin portion 192 and lower impact beam 114. With this arrangement, extended portion 155 may present inwardly extending surface 194 that contacts inner shell 106 during a collision and prevents lower impact beam 114 from colliding directly into inner shell 108 and the hip portion of a vehicle occupant.

Preferably, a dual support pad is shaped to maximize impact absorption and protect portions of a vehicle occupant during a collision. In some embodiments, a dual support pad may have a shape that conforms to a side view of a torso of a vehicle occupant. As previously discussed, a dual support pad may include extended portions that extend further toward a portion of a vehicle occupant. Similarly, a dual support pad may include tapered portions that may be recessed with respect to other portions of a dual support pad. Tapered portions may increase the flexibility of a dual support pad so the proper alignment with a vehicle occupant is maintained during a collision.

In one embodiment, dual support pad 150 includes tapered portion 153 disposed between first portion 152 and second portion 154. With this arrangement, dual support pad 150 is shaped so that portions 152 and 154 are thicker than tapered portion 153. Tapered portion 153 preferably increases the effectiveness of portions 152 and 154 when protecting shoulder and hip portions, respectively, of a vehicle occupant during a collision. Using this configuration, tapered portion 153 may deflect during a collision so that first portions 152 can maintain proper alignment with the shoulder portion and second portion 154 can maintain proper alignment with the hip portion of a vehicle occupant.

In some embodiments, a door may be associated with additional pads. For example, a vehicle door may include a pad that is disposed adjacent to an inner shell. In some cases, the pad could be further associated with a portion of a vehicle occupant. In a preferred embodiment, a vehicle door may include a pad that is attached to the inner shell and configured to associate with the shoulder portion of a vehicle occupant.

In this embodiment, collision absorption system 100 may be associated with upper pad 170. Preferably, upper pad 170 may be attached to inner shell 108. In some cases, upper pad 170 may be disposed adjacent to dual support pad 150. In a preferred embodiment, upper pad 170 may be configured to associate with first portion 152 of dual support pad 150. In particular, upper pad 170 may be configured to contact first portion 152 during a side impact collision. Using this arrangement, upper pad 170 may provide additional support to the shoulder portion of a vehicle occupant during a side impact collision.

Although upper pad 170 is associated with first portion 152 in the current embodiment, in other embodiments, upper pad 170 may be associated with another portion of dual support pad 150. In other embodiments, upper pad 170 may not associated with dual support pad 150 at all. Additionally, in some embodiments, door 102 may be associated with additional pads, including pads disposed below upper pad 170.

Generally, pads 150 and 170 may be made of any material that provides impact absorption. Examples of materials include, but are not limited to, foam and/or plastic materials. In some cases, pads 150 and 170 could be made of the same materials. In other cases, pads 150 and 170 could be made of different materials.

Preferably, a collision absorption system includes provisions for attaching one or more pads to a door. In some embodiments, a pad may be attached to an exterior shell of a door. In other embodiments, a pad may be attached to an inner shell of a door. In a preferred embodiment, a pad may be attached to one or more impact beams associated with an exterior shell of a door.

Generally, a pad can be attached to an impact beam using any method known in the art for attaching pads to doors. In some cases, the pad could be attached using screws. In other cases, the pad could be attached using an adhesive of some kind. In a preferred embodiment, the pad may be attached using one or more clips that may be further associated with the impact beam.

In this embodiment, dual support pad 150 may include first attachment portion 161, second attachment portion 162 and third attachment portion 163. Preferably, first attachment portion 161 and second attachment portion 162 are disposed adjacent to first portion 152. Also, third attachment portion 163 may be associated with second portion 154. Each of these attachment portions 161-163 may further include holes to receive a fastener of some kind. Preferably, first attachment portion 161, second attachment portion 162 and third attachment portion 163 are associated with first hole 171, second hole 172 and third hole 173, respectively.

Dual support pad 150 may be further associated with fasteners. Generally, any type of fasteners may be used, including, but not limited to, screws, bolts, or any other type of fasteners. In a preferred embodiment, the fasteners may be clips. Preferably, first hole 171, second hole 172 and third hole 173 are configured to receive first clip 181, second clip 182 and third clip 183, respectively. Additionally, in some embodiments, clips 181-183 may be further associated with fifth brace 186 and sixth brace 187. Braces 186 and 187 may be used to further secure dual support pad 150 to impact beams 114 and 116.

FIG. 2 is an assembled view of a preferred embodiment of a portion of collision absorption system 100. In particular, the relative location of dual support pad 150 to impact beams 114 and 116 can clearly be seen in this Figure. For purposes of clarity, only some components associated with door 102 are shown in this Figure. In particular, inner shell 108, window 120 and upper pad 170 are not illustrated.

In this embodiment, dual support pad 150 has been secured to impact beams 114 and 116. In some cases, dual support pad 150 may be attached to impact beams 114 and 116 near rear side 202 of door 102. This arrangement may facilitate alignment of dual support pad 150 with the shoulder and hip portions of a vehicle occupant. In other cases, dual support pad 150 may be attached to impact beams at other portions of door 102.

Preferably, first portion 152 may be associated with upper impact beam 116. Also, second portion 154 may be associated with lower impact beam 114. In other words, dual support pad 150 may generally span the space between impact beams 114 and 116. This arrangement is useful because during an impact, dual support pad 150 may absorb forces from both lower impact beam 114 and upper impact beam 116, which may help in distributing these forces during a collision.

In prior designs, a pad may be fixed into place using a bracket of some kind that covers one or more portions of the pad. Generally, the bracket is fastened using screws and/or bolts. As previously discussed, in the current embodiment, dual support pad 150 may be fastened into place using clips associated with various attachment portions. This arrangement may eliminate the need of brackets that cover one or more portions of the pad. In some cases, using clips may save manufacturing time over traditional methods that incorporate brackets that must be attached using screws and/or bolts.

FIGS. 3-4 are enlarged isometric views of a preferred embodiment of various attachment portions associated with dual support pad 150. Referring to FIG. 3, first clip 181 and second clip 182 may be configured to associate with upper impact beam 116 at first portion 152. In some embodiments, first clip 181 and second clip 182 may be configured to attach to a brace of some kind. In this embodiment, first clip 181 and second clip 182 are configured to attach to fifth brace 186. In some cases, fifth brace 186 may attach to upper impact beam 116 using known methods of attaching braces and rods. In other cases, fifth brace 186 may attach directly to outer shell 106 (see FIGS. 1 and 2). In a preferred embodiment, fifth brace 186 is configured to wrap over upper impact beam 116. With this arrangement, dual support pad 150 may be secured to upper impact beam 116.

Referring to FIG. 4, third clip 183 may be configured to associate with lower impact beam 114 at second portion 154. In some cases, third clip 183 may attach to a brace associated with lower impact beam 114. In a preferred embodiment, third clip 183 may attach directly to sixth brace 187. In some cases, sixth brace 187 could be attached to lower impact beam 114 using known methods of attaching braces and rods. In other cases, sixth brace 187 could be integrally formed with lower impact beam 114. With this arrangement, dual support pad 150 may be secured to lower impact beam 114.

Figure 7:
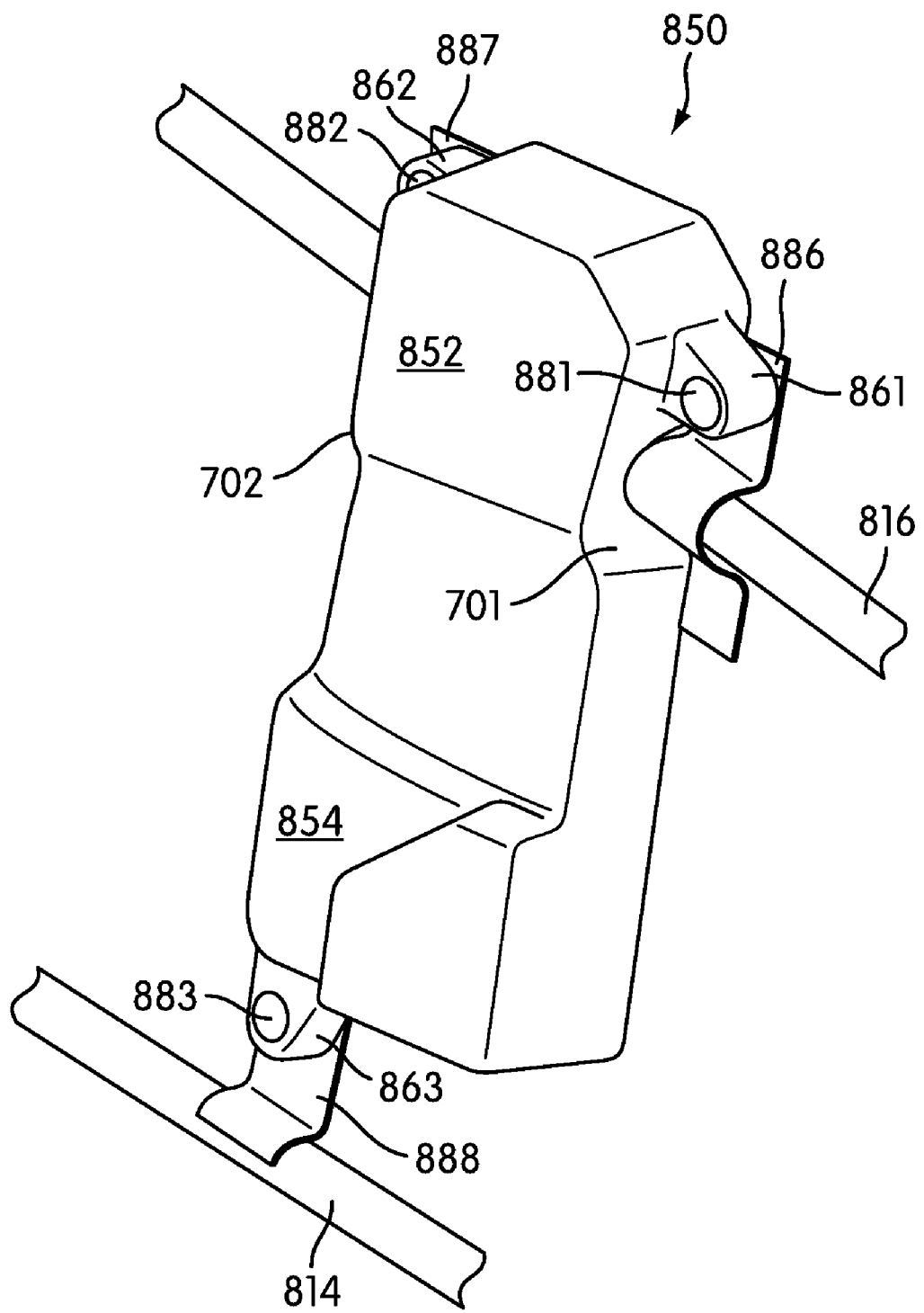
FIG. 7 is an enlarged isometric view of an exemplary embodiment of a dual support pad.
Figure 8:
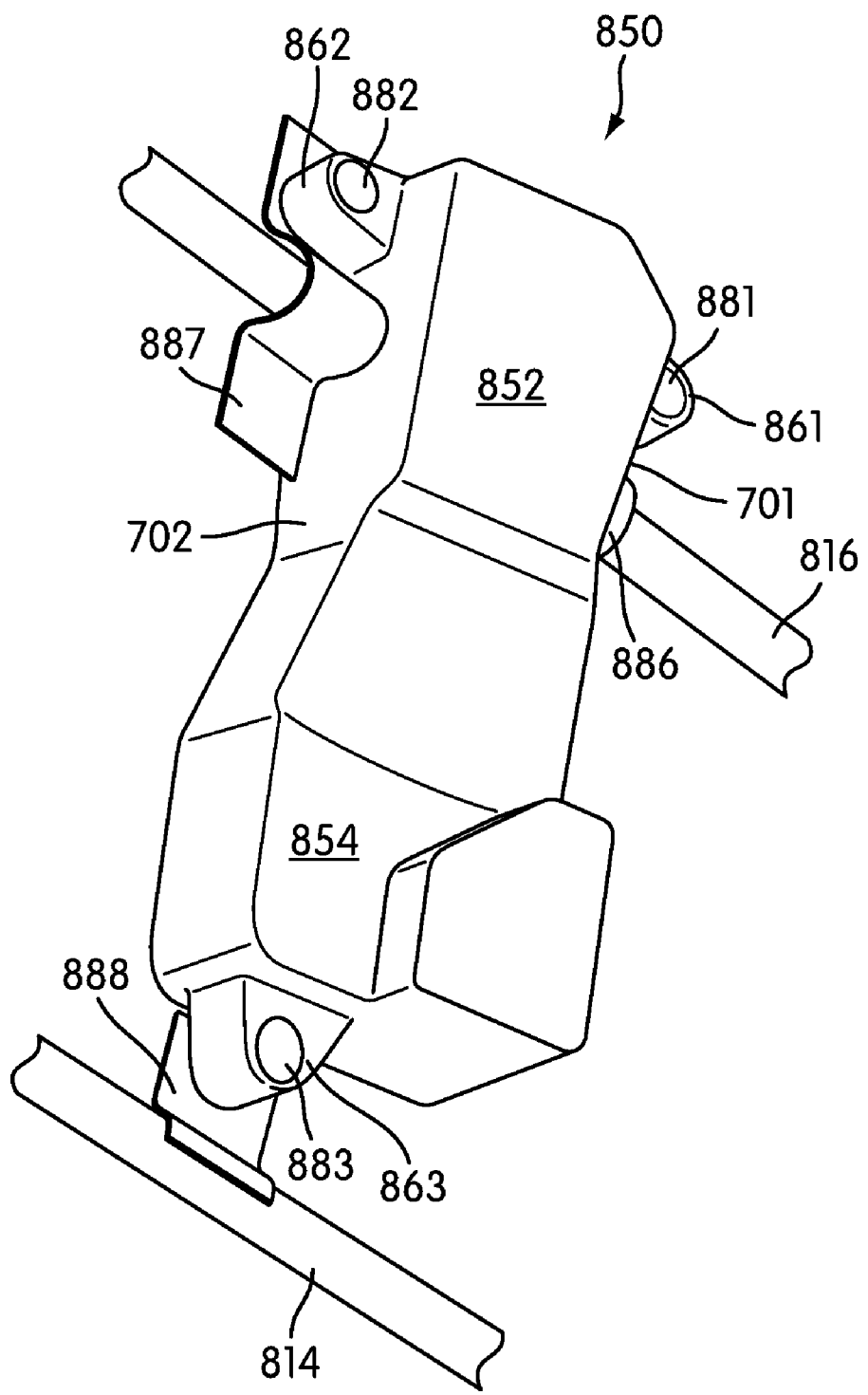
FIG. 8 is an enlarged isometric view of an exemplary embodiment of a dual support pad.

Generally, attachment portions of a dual support pad may be arranged in any manner to assist in securing a dual support pad in place. FIGS. 7-8 illustrate an alternative embodiment of a dual support pad. In this embodiment, dual support pad 850 includes first attachment portion 861, second attachment portion 862 and third attachment portion 863. In a manner similar to the previous embodiment, third attachment portion 863 is disposed adjacent to second portion 854 of dual support pad 850. Similarly, first attachment portion 861 and second attachment portion 862 are disposed adjacent to first portion 852 of dual support pad 850.

However, in this alternative embodiment, first attachment portion 861 is disposed on first side 701 of first portion 852. In addition, second attachment portion 862 is disposed on second side 702, opposite first side 701, of first portion 852. Preferably, this arrangement of first attachment portion 861 on first side 701 and second attachment portion 862 on second side 702 assists in securing dual support pad 850, and in particular first portion 852, in place within a collision absorption system.

As previously discussed, attachment portions may be associated with fasteners such as clips to secure a dual support pad in place within a collision absorption system. In this exemplary embodiment, first attachment portion 861, second attachment portion 862 and third attachment portion 863 are configured with holes to receive first clip 881, second clip 882 and third clip 883, respectively.

In some embodiments, fasteners may be associated with impact beams. In some cases, fasteners may be associated with braces of impact beams. In this exemplary embodiment, first clip 881 and second clip 882 may be associated with upper impact beam 816. Also, third clip 883 may be associated with lower impact beam 814. Preferably, first portion 852 may be attached to upper impact beam 816 by securing first clip 881 to first brace 886 of upper impact beam 816 and second clip 882 to second brace 887 of upper impact beam 816. In this manner, first portion 852 may be attached to upper impact beam 816 on first side 701 and second side 702. In addition, third clip 883 attaches third attachment portion 863 to third brace 888 of lower impact beam 814. With this configuration, dual support pad 850 preferably remains in place during a collision to absorb and distribute forces from lower impact beam 814 and upper impact beam 816.

As previously discussed, a dual support pad may be configured to provide protection to a vehicle occupant during a side impact collision. In particular, a first portion may be configured to facilitate protection for a shoulder portion of a vehicle occupant. Likewise, a second portion may be configured to facilitate protection for a hip portion of a vehicle occupant.

Figure 5:
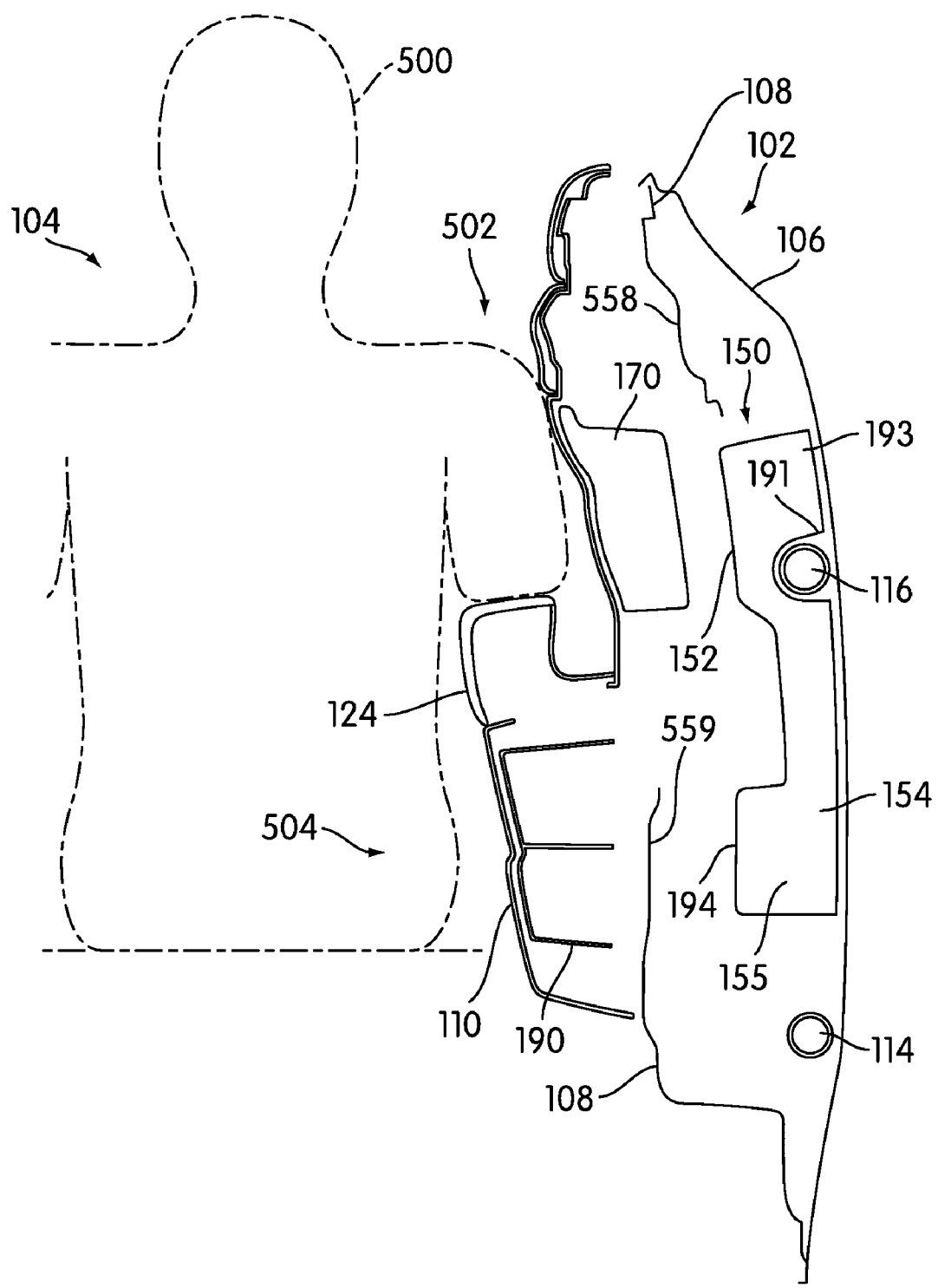
FIG. 5 is an exposed view of a preferred embodiment of a vehicle occupant sitting adjacent to a motor vehicle door with a collision absorption system.

FIG. 5 is an exposed view of a preferred embodiment of vehicle occupant 500 sitting adjacent to door 102 as viewed from behind occupant 500. For purposes of illustration, vehicle occupant 500 may be a front side passenger and is seen to be facing forward with an arm resting on armrest 124. This position generally illustrates a normal position of vehicle occupant 500 with respect to door 102 during driving.

Preferably, dual support pad 150 is disposed between outer shell 106 and inner shell 108. In particular, dual support pad 150 may be disposed between upper portion 558 and lower portion 559 of inner shell 108. With this arrangement, dual support pad 150 may be configured to provide protection to vehicle occupant 500.

As previously discussed, outer portion 193 of dual support pad 150 is configured to confront outer shell 106. In some cases, outer portion 193 may have a slight curvature to conform to the slight curvature of outer shell 106. With this arrangement, forces transferred from outer shell 106 to dual support pad 150 during a collision may be transferred over a large surface area of dual support pad 150 to provide to increased absorption of collision forces. In prior systems, for example, separate shoulder and hip pads provide a smaller surface area to receive forces from outer shell 106.

In some embodiments, first portion 152 receives upper impact beam 116 at recess 191. In some cases, a portion of upper impact beam 116 may be generally coincident with outer portion 193. In other cases, some portions of upper impact beam 116 may be only partially disposed within recess 191. In other words, some portions of upper impact beam 116 could be disposed closer to outer shell 106 than outer portion 193 of dual support pad 150. In still other cases, the entirety of some portions of upper impact beam 116 may be disposed within recess 191, so that outer portion 193 of dual support pad 150 is disposed closer to outer shell 106 than some portions of upper impact beam 116. By varying the position of upper impact beam 116 with respect to recess 191 and dual support pad 150 the force absorbing characteristics of dual pad 150 can be modified.

In some embodiments, additional pads may be included in a collision absorption system to protect particular portions of a vehicle occupant. In this embodiment, lower pad 190 may be included to protect hip and leg portions of vehicle occupant 500. In some cases, lower pad 190 may be disposed between interior trim panel 110 and lower portion 559 of inner shell 108. With this arrangement, lower pad 190 may interact with second portion 154 to provide additional protection to the hip and leg portions of vehicle occupant 500 during a collision.

Although lower pad 190 may be associated with second portion 154 in the current embodiment, in other embodiments, lower pad 190 may be associated with another portion of dual support pad 150. In other embodiments, lower pad 190 may not be associated with dual support pad 150 at all. Furthermore, in some embodiments, a collision absorption system may be associated with additional pads.

In this embodiment, shoulder portion 502 of vehicle occupant 500 may be approximately aligned with upper pad 170 and first portion 152 of dual support pad 150. In some cases, upper impact beam 116 may also be generally aligned with upper pad 170. This arrangement may provide increased support to shoulder portion 502 during a collision. This arrangement may also help prevent upper impact beam 116 from applying a force directly to shoulder portion 502.

Hip portion 504 of vehicle occupant 500 may be approximately aligned with lower pad 190 and second portion 154 of dual support pad 150. In particular, extending surface 194 of extended portion 155 may be generally aligned with lower pad 190. With this arrangement, both lower pad 190 and second portion 154 of dual support pad 150 may provide protection to hip portion 504 during a collision.

At this point, prior to a collision, the alignment of portions 152 and 154 may vary. During a side impact collision, however, the motion of vehicle occupant 500 may be in a manner that more closely aligns first portion 152 and second portion 154 with portions 502 and 504, respectively.

For purposes of clarity, window 120 is not shown in this embodiment (see FIG. 1). In some embodiments, window 120 may be configured to insert between upper pad 170 and first portion 152. In some cases, a portion of window 120 may be disposed between upper pad 170 and first portion 152 when window 120 is in a lowered position. In other embodiments, window 120 could be disposed between first portion 152 and outer shell 106 instead.

In FIG. 5, the alignments of first portion 152 with upper pad 170 and second portion 154 with lower pad 190 can be observed. In some embodiments, only a portion of first portion 152 is aligned with upper pad 170, however, in the preferred embodiment shown in FIG. 5, the entirety of first portion 152 is almost completely aligned with the entirety of upper pad 170. Similarly, the entirety of second portion 154 is completely aligned with lower pad 190. This arrangement can maximize the effectiveness of the collision absorption system. Because of their alignment and their respective positions, portions 152 and 154 and pads 170 and 190 produce a pad system that can provide an additional energy absorbing stroke during a collision.

Figure 6:
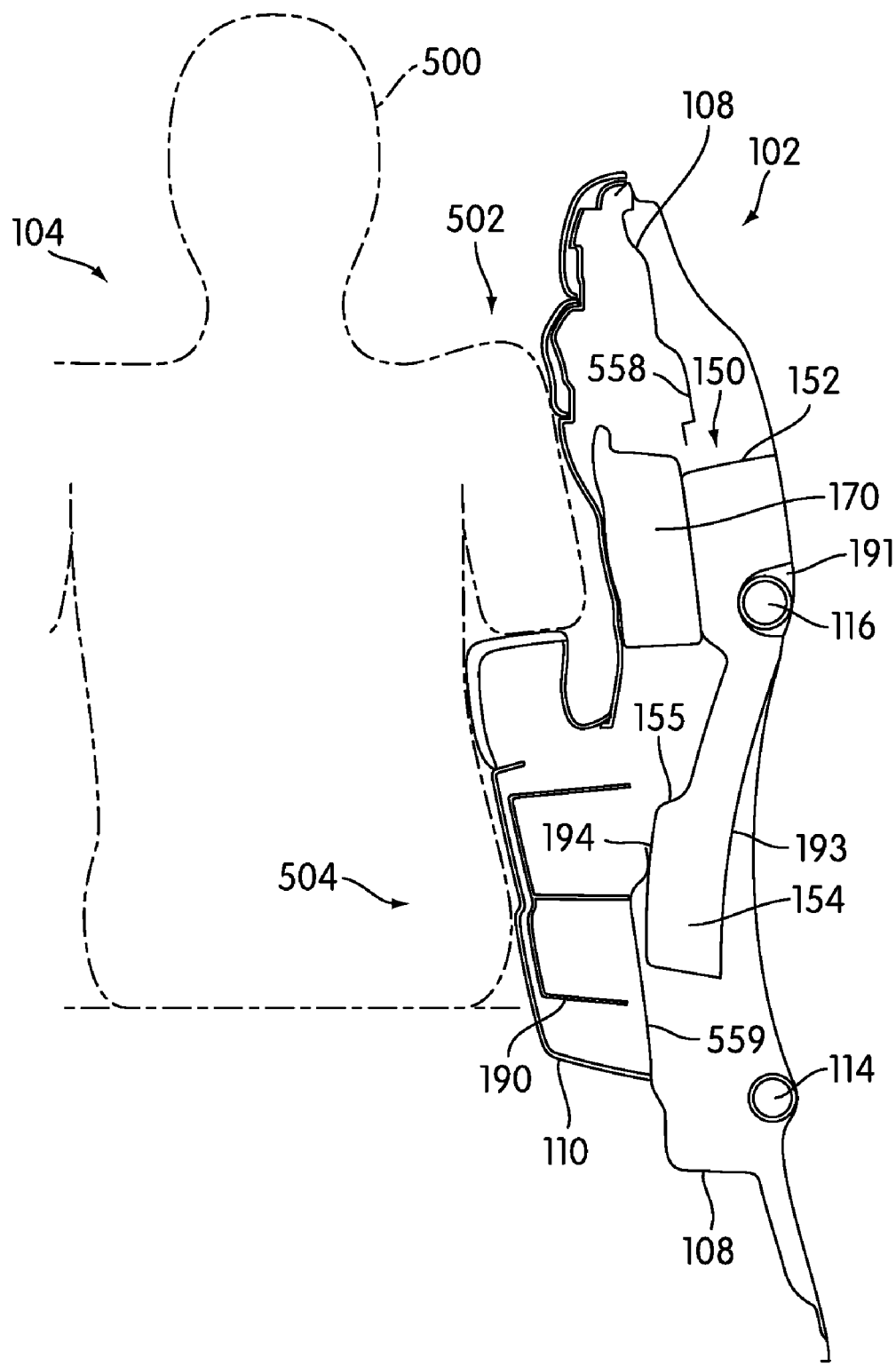
FIG. 6 is a cross-sectional view of a preferred embodiment of a motor vehicle door after an impact.

FIG. 6 is a cross-sectional view of a preferred embodiment of door 102 in a post-impact condition. The force of the impact causes upper impact beam 116 to move towards interior 104 of the motor vehicle. As upper impact beam 116 moves towards interior 104, first portion 152 of dual support pad 150 also moves towards interior 104. In some cases, first portion 152 contacts at least a portion of upper pad 170. After the two pads make contact, upper impact beam 116 continues to move towards interior 104 and first portion 152 and upper pad 170 move together and eventually make contact with inner shell 108. In some embodiments, side impact airbags may deploy if the collision is severe enough. As the collision continues, inner shell 108 makes contact with shoulder portion 502 of vehicle occupant 500 via interior trim panel 110 and pushes vehicle occupant 500 towards interior 104. Preferably, the force of impact to shoulder portion 502 is reduced substantially by first portion 152 and upper pad 170, which may help prevent injury to shoulder portion 502.

Simultaneously, during the collision, the force of the impact causes lower impact beam 114 to move towards interior 104 of the motor vehicle. As lower impact beam 114 moves toward interior 104, second portion 154 also moves towards interior 104. As the collision continues, lower impact beam 114 continues to move towards interior 104 and second portion 154 makes contact with lower portion 559 of inner shell 108. In some cases, lower portion 559 of inner shell 108 contacts at least a portion of lower pad 190. Following this, lower pad 190 makes contact with hip portion 504 of vehicle occupant 500 via interior trim panel 110 and pushes vehicle occupant 500 towards interior 104. It should be understood that during this side impact collision, hip portion 504 of vehicle occupant 500 may be shifted in the direction of trim panel 110. Preferably, the force of impact to hip portion 504 is reduced substantially by second portion 154 and lower pad 190, which may help prevent injury to hip portion 504.

The current design allows for various levels of impact absorption over previous designs, incorporating both impact beams and a dual support pad. In the current embodiment, some portions of dual support pad 150 may be disposed between impact beams 114, 116 and interior trim panel 110. For example, in this embodiment, extended portion 155 is disposed between impact beams 114, 116 and interior trim panel 110. Additionally, other portions of dual support pad 150 are disposed between impact beams 114, 116 and interior trim panel 110. This arrangement provides multiple levels of impact absorption during an impact and provides an improvement over prior designs incorporating only padding to absorb forces during a collision.

Although the current embodiment includes impact beams, in some embodiments, a dual support pad may provide protection without impact beams to a vehicle occupant during a collision. For example, the entirety of a dual support pad may be disposed between impact beams. In other cases, a dual support pad may be disposed in a portion of a motor vehicle without impact beams. The dual support pad preferably functions without impact beams to absorb some of the force of an impact and protect a vehicle occupant. In particular, the extended and tapered portions of the dual support pad may be configured to deflect and protect vital portions of a vehicle occupant during a collision.

Generally, a dual support pad may be disposed within any body panel or portion of a motor vehicle to protect vehicle occupants during a front end, rear end or side collision. The embodiments discussed in this detailed description associate a dual support pad with a door of a motor vehicle, including both front doors and rear doors of a vehicle. In other embodiments, however, a dual support pad may be disposed within or near other portions of a motor vehicle associated with a vehicle occupant.

Generally, a dual support pad could be disposed between any portion of an inner perimeter of a passenger cabin and an outer perimeter of the motor vehicle. In some cases, the perimeter of a passenger cabin may be an interior vehicle paneling. Likewise, the perimeter of the motor vehicle may be an outer vehicle paneling. Therefore, the principles discussed with respect to the arrangement of a dual support pad between an outer shell and an inner shell could be applied to any portion of a motor vehicle with an outer perimeter and a perimeter associated with the passenger cabin.

In one embodiment, a dual support pad may be disposed within a body panel disposed proximate a rear seat of a motor vehicle to protect occupants during side or rear end collisions. For example, a two door motor vehicle may include rear paneling disposed adjacent to rear seat passengers rather than a door. In another embodiment, a dual support pad may be disposed within a tailgate of a motor vehicle.

Through the use of the disclosed pad arrangement, occupant injury can be reduced by providing additional energy absorbing stroke. Also, the arrangement of the pads and their particular location at both shoulder height and hip height help to ensure that the greatest portion of the occupant is protected during a collision.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A door of a motor vehicle, comprising:
an outer shell facing an exterior of the vehicle;
an interior trim panel having an inner surface facing an interior of the vehicle;
an upper impact beam disposed adjacent to the outer shell and a lower impact beam disposed adjacent the outer shell and disposed below the upper impact beam, wherein the upper impact beam and the lower impact beam extend in a longitudinal direction with respect to the vehicle;
a dual support pad having a first portion configured to align with a shoulder portion of an occupant and a second portion configured to align with a hip portion of the occupant;
wherein the first portion is associated with the upper impact beam and the second portion is associated with the lower impact beam; and
wherein, along a longitudinal section of the upper impact beam, the first portion of the dual support pad encloses a side of the upper impact beam facing the interior of the vehicle.

2. The door according to claim 1, wherein the dual support pad is attached to the upper impact beam using a brace.

3. The door according to claim 1, wherein the dual support pad is attached to the upper impact beam using one or more clips.

4. The door according to claim 1, wherein the dual support pad is attached to the lower impact beam using a brace via a clip.

5. The door according to claim 1, wherein the first portion extends toward the interior of the vehicle a first thickness, wherein the second portion extends toward the interior of the vehicle a second thickness, wherein the dual support pad further comprises an intermediate portion connecting the first portion to the second portion and extending toward the interior of the vehicle a third thickness, wherein the first and second thicknesses are greater than the third thickness, and wherein the second portion includes an extended portion that extends toward the interior of the vehicle a fourth thickness that is greater than the second thickness.

6. The door according to claim 1, wherein the first portion and the second portion are integrally joined by an intermediate portion having a lateral thickness less than that of the first portion and the second portion, and wherein the first portion of the dual support pad encloses the longitudinal section of the upper impact beam against the outer shell in a lateral direction with respect to the vehicle.

7. A door of a motor vehicle, comprising:
a dual support pad configured to provide support to a shoulder portion of an occupant and to a hip portion of the occupant;
an impact beam associated with an interior of the vehicle door;
an interior trim panel disposed proximate to an interior of the motor vehicle; and
wherein a portion of the dual support pad is disposed between the impact beam and the interior trim panel,
wherein the dual support pad includes a first portion configured to align with the shoulder portion of a vehicle occupant and a second portion configured to align with the hip portion of a vehicle occupant,
wherein the door includes an upper impact beam and a lower impact beam, and
wherein the upper impact beam and the lower impact beam extend in a longitudinal direction with respect to the vehicle, wherein the first portion is associated with the upper impact beam and the second portion is associated with the lower impact beam, and wherein, along a longitudinal section of the upper impact beam, the first portion of the dual support pad encloses a side of the upper impact beam facing the interior of the vehicle.

8. The door according to claim 7, wherein the door includes an upper pad that is configured to align with the first portion of the dual support pad.

9. The door according to claim 7, wherein the dual support pad is associated with a front door of the motor vehicle.

10. A door of a motor vehicle, comprising:
a dual support pad configured to provide support to a shoulder portion of an occupant and to a hip portion of the occupant;
an impact beam associated with an interior of the vehicle door;
an interior trim panel disposed proximate to an interior of the motor vehicle; and
wherein a portion of the dual support pad is disposed between the impact beam and the interior trim panel,
wherein the dual support pad includes a first portion configured to align with the shoulder portion of a vehicle occupant and a second portion configured to align with the hip portion of a vehicle occupant,
wherein the door includes an upper impact beam and a lower impact beam, and
wherein the first portion is attached to the upper impact beam using a brace.

11. The door according to claim 10, wherein the door includes an upper pad that is configured to align with the first portion of the dual support pad.

12. A door of a motor vehicle, comprising:
a dual support pad configured to provide support to a shoulder portion of an occupant and to a hip portion of the occupant;
an impact beam associated with an interior of the vehicle door;
an interior trim panel disposed proximate to an interior of the motor vehicle; and
wherein a portion of the dual support pad is disposed between the impact beam and the interior trim panel,
wherein the dual support pad includes a first portion configured to align with the shoulder portion of a vehicle occupant and a second portion configured to align with the hip portion of a vehicle occupant,
wherein the door includes an upper impact beam and a lower impact beam, and
wherein the first portion is attached to the upper impact beam using one or more clips.

13. The door according to claim 12, wherein the door includes an upper pad that is configured to align with the first portion of the dual support pad.

14. A door of a motor vehicle, comprising:
an outer shell facing an exterior of the motor vehicle;
an interior trim panel having an inner surface facing an interior of the vehicle;
a dual support pad configured to provide support to a shoulder portion of a vehicle occupant and to a hip portion of the vehicle occupant;
an impact beam disposed adjacent to the outer shell and extending in a longitudinal direction with respect to the motor vehicle;
the dual support pad being disposed adjacent to the outer shell;
the dual support pad enclosing, along a longitudinal section of the impact beam, a side of the impact beam facing the interior of the vehicle;
an upper pad contained inside the door and disposed between the interior trim panel and the dual support pad in a lateral direction; and
wherein a first portion of the dual support pad is configured to directly contact the upper pad during a side impact collision.

15. The door according to claim 14, wherein the upper pad is associated with the shoulder portion of a vehicle occupant.

16. The door according to claim 14, wherein the first portion is associated with the shoulder portion of the vehicle occupant.

17. The door according to claim 14, wherein the dual support pad includes a second portion that is integrally formed with the first portion and wherein the second portion is associated with the hip portion of the vehicle occupant.

18. The door according to claim 16, wherein the impact beam comprises an upper impact beam, and wherein the dual support pad is associated with the upper impact beam and a lower impact beam.

19. The door according to claim 17, wherein the impact beam comprises an upper impact beam, and wherein the first portion is associated with the upper impact beam and the second portion is associated with the lower impact beam.

20. The door according to claim 18, wherein the dual support pad is attached to the lower impact beam and the upper impact beam using clips.

21. The door according to claim 14, wherein the upper pad may be separated from the first portion by a window associated with the door when the window is in a lowered position.

22. A collision absorption system for a motor vehicle, the system comprising:
- a dual support pad having a first portion configured to align with a shoulder portion of an occupant and a second portion configured to align with a hip portion of the occupant, the second portion comprising an extended portion configured to extend further towards the hip portion of the occupant; and
- wherein the first portion is integral with the second portion, and the first portion comprises a first attachment portion for attachment to an upper impact beam with a first clip, and the second portion comprises a second attachment portion for attachment to a lower impact beam with a second clip.

23. The collision absorption system according to claim 22, wherein the dual support pad is associated with a front door of the motor vehicle.

24. The collision absorption system according to claim 22, wherein the dual support pad is associated with a door panel of the motor vehicle.

25. The collision absorption system according to claim 22, wherein the dual support pad is associated with a tailgate of the motor vehicle.

26. The collision absorption system according to claim 22, wherein the first portion of the dual support pad includes a recess configured to receive an upper impact beam, wherein the upper impact beam extends in a longitudinal direction with respect to the vehicle, and wherein, along a longitudinal section of the upper impact beam, the recess encloses a side of the upper impact beam facing an interior of the vehicle.

27. The collision absorption system according to claim 26, wherein the recess opens toward an outer shell of the motor vehicle such that the longitudinal section of the upper impact beam is disposed between the recess and the outer shell.

* * * * *